United States Patent [19]

Ensley et al.

[11] Patent Number: 4,717,256
[45] Date of Patent: Jan. 5, 1988

[54] FIBER OPTIC RATE SENSOR

[75] Inventors: Donald Ensley, Bodega Bay; Hiroshi Satake, El Sobrante, both of Calif.

[73] Assignee: The United States of America as represented by the Secretary of the Navy, Washington, D.C.

[21] Appl. No.: 891,809

[22] Filed: Jul. 21, 1986

[51] Int. Cl.4 .......................... G01B 9/02; G01C 19/64
[52] U.S. Cl. ..................................................... 356/350
[58] Field of Search .......................................... 356/350

[56] References Cited
U.S. PATENT DOCUMENTS

4,545,682 10/1985 Greenwood ........................ 356/350

Primary Examiner—Vincent P. McGraw
Assistant Examiner—S. A. Turner
Attorney, Agent, or Firm—R. F. Beers; C. D. B. Curry; W. C. Daubenspeck

[57] ABSTRACT

In a fiber optic rate sensor employing a Sagnac ring circuit wherein an optical source launches an optical signal which is divided into two equals signals which are coupled in opposite directions through a multi-turn fiber optic coil to provide two counter-propagating optical signals. The two counter-propagating optical signals are coupled to a photodetector after passing through the multiturn fiber coil. The signals detected at the photodetector have traversed identical optical paths between said source and said photodetector and have undergone a Sagnac phase shift directly related to the rate of rotation of the fiber coil about its axis in inertial space. The two counterpropagating signals are phase modulated by a phase modulator at one end of the fiber optic coil and the output of the photodetector undergoes signal processing in a signal processor to produce a rate output directly related to the rate of rotation of the fiber coil. The improvement being an improved phase modulation and signal processor which comprises a crystal-controlled oscillator providing a sine wave reference signal means for coupling the crystal of the crystal-controlled oscillator to the optical fiber at one end of the coil to produce a non-reciprocal phase modulation of the counter-propagating optical signals, means for multiplying the sine wave reference signal and the output from the photodetector to produce a product output, and means for integrating the product output over a whole number of complete reference cycles to produce the rate output, the sine wave reference signal being coupled to means for integrating to control the integration period of the means for integrating.

18 Claims, 12 Drawing Figures

FIG_1

FIG_2

FIG_5

FIG_3

FIG_6

FIBER OPTIC RATE SENSOR

BACKGROUND OF THE INVENTION

This invention relates in general to optical gyroscopes and, in particular, to fiber-optic gyroscopes. The invention relates especially to phase modulation and signal processing in fiber-optic gyroscopes.

The disadvantages of mechanical gyroscopes having spinning masses are well known. For example, they suffer from relatively long "spin-up" times measured in minutes or hours. They contain large numbers of precision parts and are expensive and time-consuming to produce. They are dynamically sensitive to shock and vibration due to mechanical compliance and spin synchronous frequency response phenomena. When they are supported by ball bearings, they may have a relatively short useful life. In contrast, fiber-optic gyroscopes offer many advantages. They turn on and off instantly. They have a long shelf life and can be small and rugged. Since they do not require expensive gimballed mounting systems, they are relatively low in cost.

In the basic fiber-optic gyroscope, an optical beam is split into two equal beams and coupled in opposite directions through a multiturn fiber optic coil. The two counter-propagating beams are recombined and coupled to a photodetector such that the two beams traverse identical closed optical paths. When the fiber coil is rotated about its axis relative to inertial space, Sagnac phase shifts of equal magnitude and opposite sign are produced in the two beams. This Sagnac phase shift is linearly proportional to this rotational rate and is detected as a change in the interference pattern at the photodetector.

As is evident from the article entitled "Fiber-optic gyroscopes" by Kim and Shaw, IEEE Spectrum, March 1986, the fiber-optic gyroscope, at present, is primarily a laboratory device and many investigators are working on perfecting the fiber-optic gyroscope for use in a practical environment. One problem in providing a practical rate sensor based on the Sagnac effect has been the signal processing required to provide a useful rate output. One approach to this problem involves sinusoidally modulating the counter propagating optical beams near one end of the fiber coil to provide a nonreciprocal phase shift in the beams and then demodulating the output of the photodetector to provide a linear signal proportional to the rotation rate. However, heretofore, the implementation of this approach has not been entirely satisfactory in providing a practical device. Accordingly, the present invention is directed to providing a phase modulation and signal processing technique which enables the construction of a practical fiber-optic rate sensor using a Sagnac ring circuit as the rate sensing means.

SUMMARY OF THE INVENTION

It is therefore a primary object of the present invention to provide a fiber-optic gyroscope for use in a practical environment.

Another object is to provide a fiber-optic gyroscope employing an improved phase modulation and signal processing technique.

Another object is to provide a fiber-optic gyroscope that is insensitive to environmental effects.

Another object is to provide phase modulation and signal processing in a fiber-optic gyroscope that suppresses noise bias and effectively cancels small errors in fiber ring transit time and small errors in optical phase shift.

These objects and others are provided by a fiber-optic gyroscope in which the optical phase modulation and the electronic signal processing circuits are functionally integrated and work together to carry out the modulation/demodulation process. The optical phase modulation is provided by the crystal in a self-excited crystal-controlled Colpitts oscillator. The Colpitts oscillator also provides a sine wave reference signal and timing signals to the signal processing circuits to enable synchronous integration and extraction of the rate phase information from the modulated signal detected by the photodector. The modulated signal, which is detected at the photodectector, is multiplied by the reference sine wave in an analog multiplier and the product is integrated over a whole number of complete reference cycles. This integrated signal is directly proportional to the sine of the input angular rate in inertial space times the first order Bessel function of the optical phase modulation amplitude. The integrated signal is applied to a sample and hold circuit where the sampling period corresponds to the integration period and the output of the sample and hold circuit is applied to a balanced driver circuit to provide a rate output signal that is directly proportional to the input angular rate.

Other objects and many of the attendant advantages and features will be readily appreciated as the present invention becomes better understood by reference to the following detailed description when considered in conjunction with the accompanying drawings wherein:

DESCRIPTION OF THE PREFERRED EMBODIMENT

Figure 1:
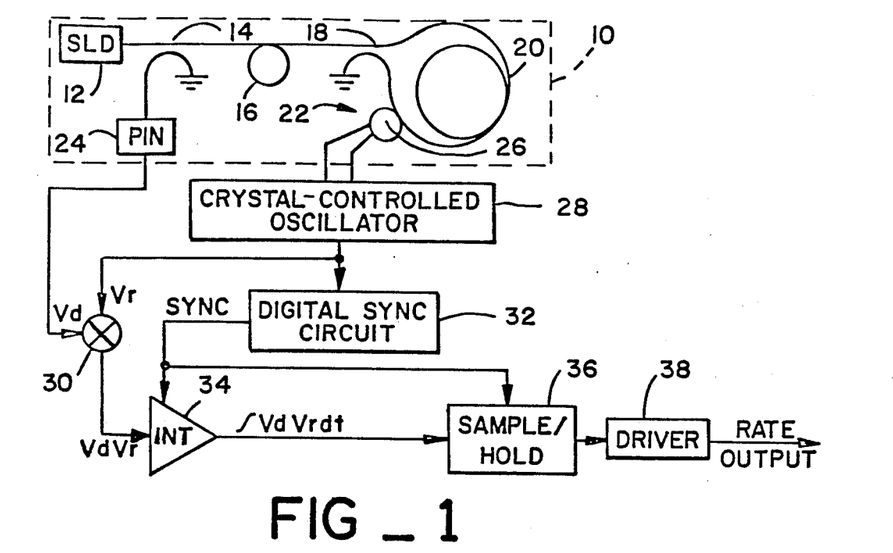
FIG. 1 is a schematic block diagram of a single axis fiber-optic rate sensor according to the present invention.

Referring now to the drawings, wherein like reference characters designate like or corresponding parts throughout the several Figures and, more particularly to FIG. 1, the preferred embodiment of a fiber optic rate sensor according to the present invention includes a continuous glass fiber Sagnac ring circuit, indicated generally by dashed line 10, and signal processing/modulation circuits associated therewith. All the optical components are fused-spliced together to form a continuous glass fiber Sagnac ring composed of fiber only with no bulk optical components. An optical source, such as a superluminescent diode (SLD) 12, launches partially coherent light into the Sagnac loop. The partially coherent light from the SLD 12 is coupled through a fiber directional coupler 14 to a polarizing fiber 16. The fiber directional coupler 14 functions as a 3 db beam splitter which couples one half of the optical beam to the polarizing fiber 16 while terminating the second half.

The polarized light from the polarizing fiber 16 is coupled to a second fiber directional coupler 18 which divides the light beam and couples one part to each end of a multiturn fiber coil 20 to provide two counter-propogating optical signals in the fiber coil. The fiber coil 20 is composed of polarization-holding single-mode fiber. A phase modulator 22, which will be described in more detail hereinafter, is disposed near one end of the fiber coil 20 to sinusoidally modulate the phase of the optical signals. The two counter-propogating signals pass through the modulator 22 at different times in their reciprocal paths to produce a nonreciprocal modulation on the signals.

The two counter-propogating optical signals, after passing through the fiber coil 20 and the phase modulator 22, are combined by the second directional coupler 18. The combined optical signals pass back through the polarizing fiber 16 and then are coupled back through the first directional coupler 14 to a photodetector such as PIN diode 24 which measures the intensity of the optical signal.

The basic Sagnac ring circuit as just described is well known in the art. The novelty of the present invention is directed to the phase modulation and the signal processing techniques which enable the construction of a practical fiber-optic rate sensor using a Sagnac ring circuit as the rate sensing means.

The electronic signal processing and optical phase modulation circuits are functionally integrated and work together to carry out the modulation/demodulation process. Turning first to the optical phase modulation, the optical phase modulation is provided by the piezoelectric crystal, in this case a Lead Zirconate Titanate (PZT) disk 26, of a crystal controlled Colpitts oscillator 28. Several turns of the optical fiber at one end of the coil 20 are wound around the periphery of the PTZ disk 26 and cemented in place with epoxy. The PZT disk 26 is operates in the radial fundamental mode which causes the fiber to expand and contract at the fundamental frequency. Since the PZT disk 26 is located at one end of the Sagnac loop, the loop transit time separates the phase between the counter-rotating light waves. The modulation amplitude of the oscillation can be adjusted to provide optimized signal processing as will be discussed hereinafter.

The PZT disk 26 is supported by a holder, a preferred embodiment of which will be described in connection with FIGS. 8–10, that makes electrical contact and mechanical pressure contact only near the center of the disk to avoid loading and Q spoiling the radial disk mode.

Referring still to FIG. 1, the phase modulated signal, Vd, which is detected at the photodetector 24 is applied to one input of an analog multiplier 30. A sine wave reference signal, Vr, which is synchronized with the modulation applied to the optical signals through the PZT disk 26, is extracted from the Colpitts oscillator 28 and applied to the other input of the multiplier 30. This sine-wave reference signal, Vr, is also applied to a digital synchronization circuit 32 to produce timing pulses which are synchronized with the drive voltage of the PZT disk 26 of the Colpitts oscillator 28.

The product output, Vd×Vr, of the analog multiplier 30 is applied to an integrator 34. The integration period of the integrator 34 is controlled by the timing pulses from the digital synchronization circuit 32 to be an integer number of reference cycles. As will be shown in connection with FIGS. 2 and 3, to second order terms, the integrator output, Vd×Vr, is directly proportional to the sine of the input angular rate in inertial space times the first order Bessel function of the optical phase modulation amplitude.

The output of the integrator 34 is coupled to a sample and hold circuit 36 where the sampling period is controlled by the digital synchronization circuit 32 to correspond to the integration period. The output of the sample and hold circuit 36 is applied to a balanced driver circuit 38 as useful rate output.

The optical phase modulation and electronic signal processing circuitry of the present invention described in connection with FIG. 1 features the use of a self-excited oscillator/optical phase modulator 28. This self-excited oscillator/optical phase modulator performs four functions: (1) it phase modulates the light in the fiber coil 20 through the PZT crystal 26; (2) it controls the frequency of the Colpitts oscillator 28; (3) it provides a reference sine wave to the analog multiplier 30 of the signal processor; and (4) it provides timing signals to the integrator 34 and the sample and hold circuit 36 to enable synchronous integration and extraction of the rate phase information from the modulated signal detected by the photodetector 24. This modulation/signal processing technique suppresses noise bias and effectively cancels small errors in the fiber ring transit time and small errors in the optical phase shift.

OPERATION OF THE MODULATOR/SIGNAL PROCESSOR

Figure 2:
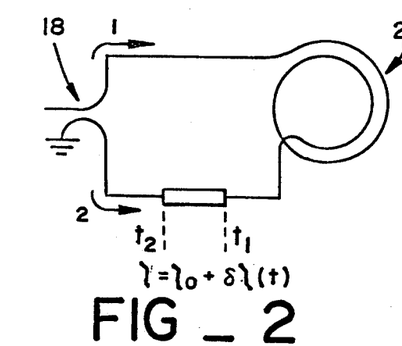
FIGS. 2 and 3 are a schematic representation of the counter propagating optical signals in the fiber coil and a plot illustrating the modulation in the optical path length, respectively, which are useful in describing the signal processing of the present invention.

As noted earlier, the output of integrator 34 is directly proportional to the sine of the input angular rate in inertial space times the 1st order Bessel function of the optical phase modulation amplitude. This may be illustrated as follows with reference to FIGS. 2 and 3. FIG. 2 shows the counter propagating optical signals 1 and 2 in the Sagnac circuit. The difference in transit time around the circuit between signal 1 having a transit time $t_1$ and signal 2 having a transit time $t_2$ is $t_2-t_1$ equals $\tau$. The length $1F(t)$ of the transit path is the non-modulated path length $l_o$ plus the change in path length $\delta l_o(t)$ due to the modulation by the phase modulator 22. When the phase shifter 22 is located at one end of the fiber coil 20, $\tau$ is the fiber coil transit time (ignoring the short time spent in traversing the phase shifter).

Figure 3:
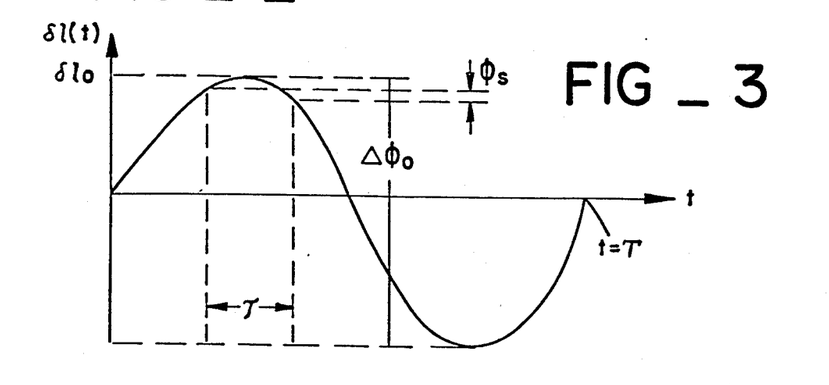

FIG. 3 illustrates the modulation in the optical path length over the phase modulation period T where $\phi_s$ is the Sagnac phase shift, $\tau$ is the coil transit time, and $\Phi_o$ is the phase shift introduced by the phase modulator 22. As illustrated by FIGS. 2 and 3, the non-reciprocal phase shift between signals 1 and 2 is time dependent and parametrically dependent on $\tau/T$. For maximum sensitivity, a phase shift $\Phi_o$ equals $\pi/2$ is introduced between the counter propagating light paths 1 and 2.

For illustration, consider the case where the maximum obtainable time dependent phase shift is given by $2k\delta l_o = \Delta\Phi_o$ where k is the effective glass fiber wave number. This occurs between peak to peak on the l(t) function. The amplitude for $\delta l_o$ is set by the response of the PZT crystal 26 in the Colpitts oscillator 28. The actual phase shift $\phi$ obtained between signals 1 and 2 will depend on the coil transit time.

The linear phase shift with frequency for each signal is given by $$\phi_1 = k\delta l_o \sin \omega t_1, \text{ and}$$

$$\phi_2 k\delta l_o \sin \omega t_2;$$

but since $t_2 = \tau + t_1$, $$\phi(t_1, \tau) = k\delta l_o \sin \omega t_1 (\cos \omega\tau - 1) + \cos \omega t_1 \sin \omega\tau].$$

The Sagnac phase shift, $\phi_s$, is now contained in the time dependent intensity at the interferometer output, I, of the photodetector 24.

$$I(t_1, \tau, \phi_s) = \tfrac{1}{2} I_o[1 + \cos(2\phi_s - (t_1, \tau)],$$

where $I_o$ is the incident intensity.

To simplify the math, consider the parameters of $\pi$, $\Omega$, k, $\delta l_o$ such that $\omega\tau = \pi$ and $2k\delta l_o = \pi/2$. This corresponds to a light fiber coil transit time of $\tau = T/2$ and a phase shift total linear displacement amplitude $\delta l_o = \lambda/8$. Then $$I(t_1, \phi_s) = \tfrac{1}{2} I_o[1 + \cos(2\phi_s + \pi/2 \cdot \sin \omega t_1)],$$

expanding the cosine term:

$$I(t_1, \phi_s) = \tfrac{1}{2} I_o[1 + \cos 2\phi_s \cos(\pi/2 \cdot \sin \omega t_1) - \sin 2\phi_s \sin(\pi/2 \cdot \sin \omega t_1)]$$

If this expression is multiplied by $\pi/2 \cdot \sin \omega t_1$ (or $\text{sign}(\pi/2 \cdot \sin \omega t_1)$) and integrated over one cycle, the cosine term vanishes and the remaining terms become $$1/T \int_0^T I(t_1, \phi_s) dt_1 = I_o/4 \cdot \sin 2\phi_s \int_0^{2\pi} \sin(\pi/2 \cdot \sin\omega t_1)(\sin\omega t_1) dt$$

$$= I_o/2 \cdot \sin 2\phi_s \int_0^{2\pi} \sin(\pi/2 \cdot \sin\omega t_1)(\sin\omega t_1) dt$$

$$<I> = I_o/2 \cdot \sin 2\phi_s \cdot J_1(\pi/2)$$

where $J_1$ is the first order Bessel function.

The resulting signal at the output of the integrator 34, assuming the photodiode 24 has a bandwidth greater than one MHz, is a phase sensitive rate signal for small $\phi_s$.

It can be shown that the foregoing relationship is applicable to arbitrary values of optical phase shift for $k\delta l(t)$ and transit time $\tau$. The cosine term in the intensity is reduced to zero by orthogonality after multiplying by $\text{sign}(\sin \omega t)$ or $\sin \omega t$ and integrating over one period of the modulation frequency. Thus, for the general case, the signal at the output of the integrator 34 is given by $$<I> = I_o/2 \cdot J_1(Z) \cdot \sin 2\phi_s \qquad \text{Equation (1)}$$

Figure 4:
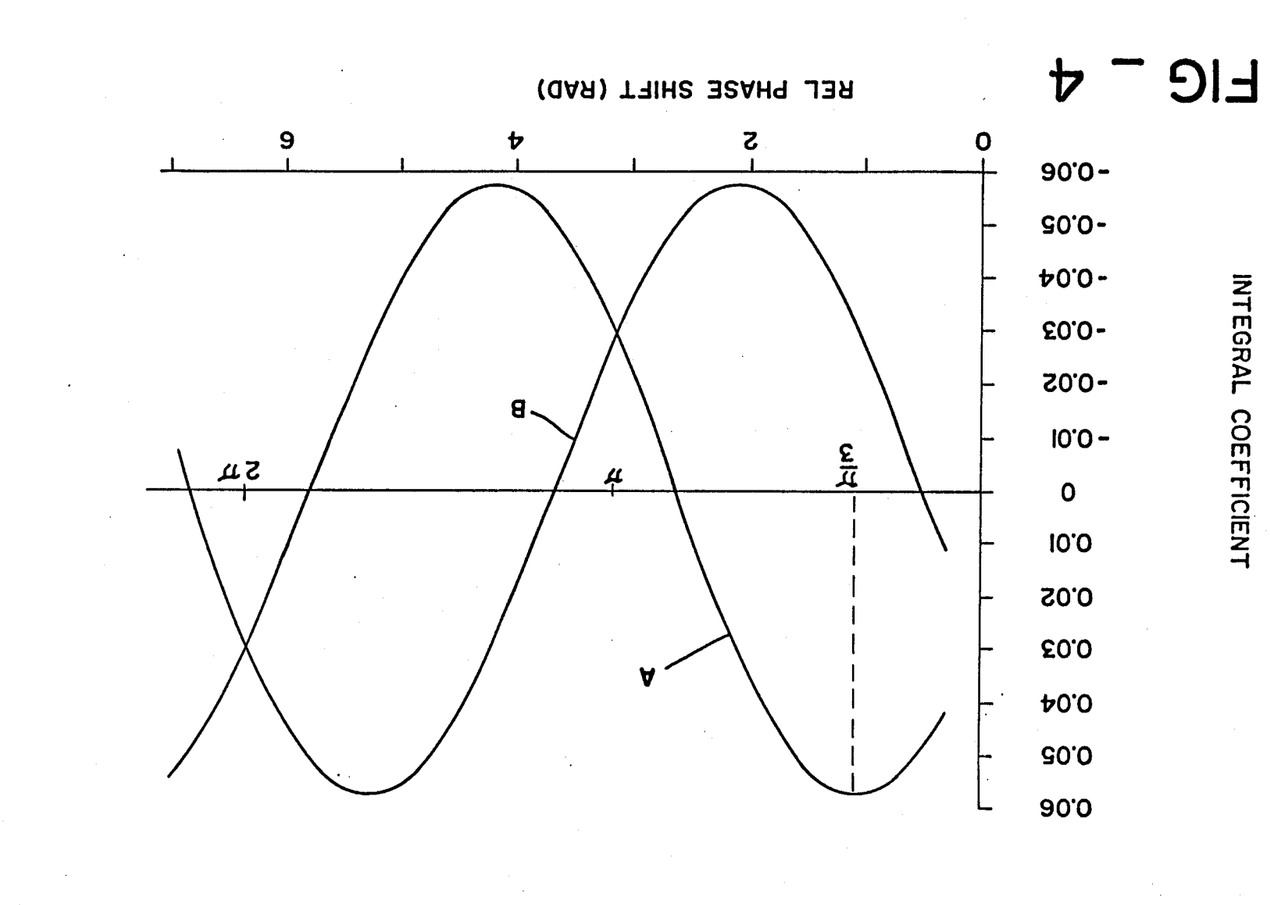
FIG. 4 is a plot illustrating the effect of the relative phase between the demodulator inputs on the coefficient of the integrated output in the system of FIG. 1.

By evaluating the total phase shift between the signals at the multiplier in the $\sin 2\phi_s$ term, it can also be shown that errors in the fiber ring transit time caused by a slowly varying light source, acceleration stress, thermal expansions and the like, are cancelled out to second order terms in the foregoing signal processing, provided a phase shift of $\pi/3$ is maintained. This is illustrated by FIG. 4 which shows the coefficient of the integral output (from integrater 34) as a function of the relative phase between the output of the detector 24 and the reference at the multiplier 30. Curve A shows the effect of phase shift in the electrical circuit and curve B shows the effect of phase shift in the optical circuit. Curve A shows that a relative phase shift of $\pi/3$ provides an integral coefficient that is maximized and is also insensitive to small changes in relative phase. In practice, most of the phase shift is designed into the electronic circuit with very little phase shift attributable to the optical circuit.

Figure 5:
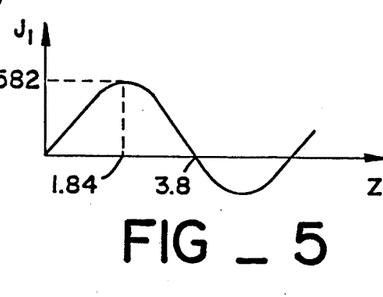
FIG. 5 is a plot of the first order Bessel function $J_1(Z)$ versus Z.

If, further, the initial value of the magnitude of Z is chosen to be at the first maximum of $J_1$ ($Z = Z_o = k\delta l_o$ = peak in $J_1$), the sensitivity to errors in the phase shift magnitude is also 2nd order. Thus errors in driving the PZT disk caused by aging, voltage controller drift and the like, are second order around the peak in $J_1$. FIG. 5 illustrates that $J_1(Z)$ has a first root at Z equals approximately 3.85 and a first maximum at approximately 1.84. This indicates a procedure for setting the initial drive voltage of the PZT crystal 26. The drive voltage of the PZT crystal may be increased from zero to where the output of the integrator 34 crosses zero indicating the first root at Z equals approximately 3.85. The first peak in $J_1$ may then be accurately located by reducing the drive voltage from Z equals 3.85 to Z equals 1.8.

Considering an otherwise noise free optical and electronic system for the system described in FIG. 1, the shot noise of the electron current in the photodiode will limit the minimum angular rate sensitivity and random drift coeficient. The Sagnac phase shift $2\phi_s$ is given by $$2\phi_s = 4\pi R L \Omega/\lambda c. \qquad \text{Equation (2)}$$

where c is the speed of light, $\lambda$ is the vaccum wavelength, R is the radius of the Sagnac ring (coil), L is the length of the Sagnac ring and equals $2\pi R \times$ the number of turns in the ring, and $\Omega$ is the input angular rate. The average detector current is $$i_o = e \eta P/h\nu,$$

where $\eta$ is the quantum efficiency, P is the optical power on the photodiode, and $h\nu$ is the energy content of each quantum of the incident light.

The mean square current fluctuation for the finite electrons transiting the detector circuit is given by $$\delta i^2 = 2e i_o B,$$

where B is the bandwidth of the detector and equals $1/T$, T being the sampling time used for detecting the diode current. Therefore, the RMS noise current is $$\delta i_N = (2eB)^{\tfrac{1}{2}} \cdot (e\eta P/h\nu)^{\tfrac{1}{2}}.$$

Since the Sagnac effect uses $\phi$ to bring about a photo current proportional to input angular rate $\Omega$, $I=I_0\phi_s$ for small $\phi_s$. Consequently a noise current will introduce a noise rate, $\delta\Omega$. From equations (2), then $$\delta\phi_s=(4\pi RL/\lambda c)(\delta\Omega),$$

where $\phi_s$ is the noise phase shift. Therefore $$\delta\Omega = (\lambda c/4 \pi RL)(\delta I/I_0) \quad \text{Equation (3)}$$
$$= (\lambda c/4 \pi RL)(2hvB/[nP])^{\frac{1}{2}}, \text{ and}$$

$$\delta\Omega/B^{\frac{1}{2}}=\text{the random drift coefficient,} \quad \text{Equation (4)}$$

where $\delta I/I_0=i_N/i_o=(2hvB/nP)^{\frac{1}{2}}$

Equation (3) gives the random drift rate corresponding to photodetector current fluctuations and thus sets one limit upon accuracy. Equation (4) is the random drift coefficient independent of integrator bandwidth.

EXAMPLES OF SHOT NOISE LIMITATIONS

Table 1 illustrates the shot noise limitation for several fiber optic rate sensor systems having different values of optical power on the photodiode, different lengths and radii for the fiber coils, and differing sampling times where the quantum efficiency is approximately 1.0, and the vacuum wavelength is $0.8 \times 10^{-4}$ cm.

TABLE

| Power $P_o$(mW) | Radius R(cm) | Length L(cm) | Sample B(Hz) | Drift Rate (degrees/hour) |
|---|---|---|---|---|
| $2 \times 10^{-6}$ | 4.5 | $2.5 \times 10^4$ | 500 | 5.14 (prototype) |
| $2 \times 10^{-6}$ | 4.5 | $2.5 \times 10^4$ | 1 | 0.25 |
| $2 \times 10^{-3}$ | 4.5 | $2.5 \times 10^4$ | 10 | 0.75 |
| 2.0 | 20.0 | $2.5 \times 10^6$ | 10 | $5 \times 10^{-5}$ |
| $2 \times 10^{-3}$ | 10.0 | $1.0 \times 10^5$ | 10 | $3 \times 10^{-2}$ |
| $2 \times 10^{-3}$ | 10.0 | $1.0 \times 10^5$ | 1 | $1 \times 10^{-2}$ |

A PROTOTYPE EMBODIMENT

Figure 6:
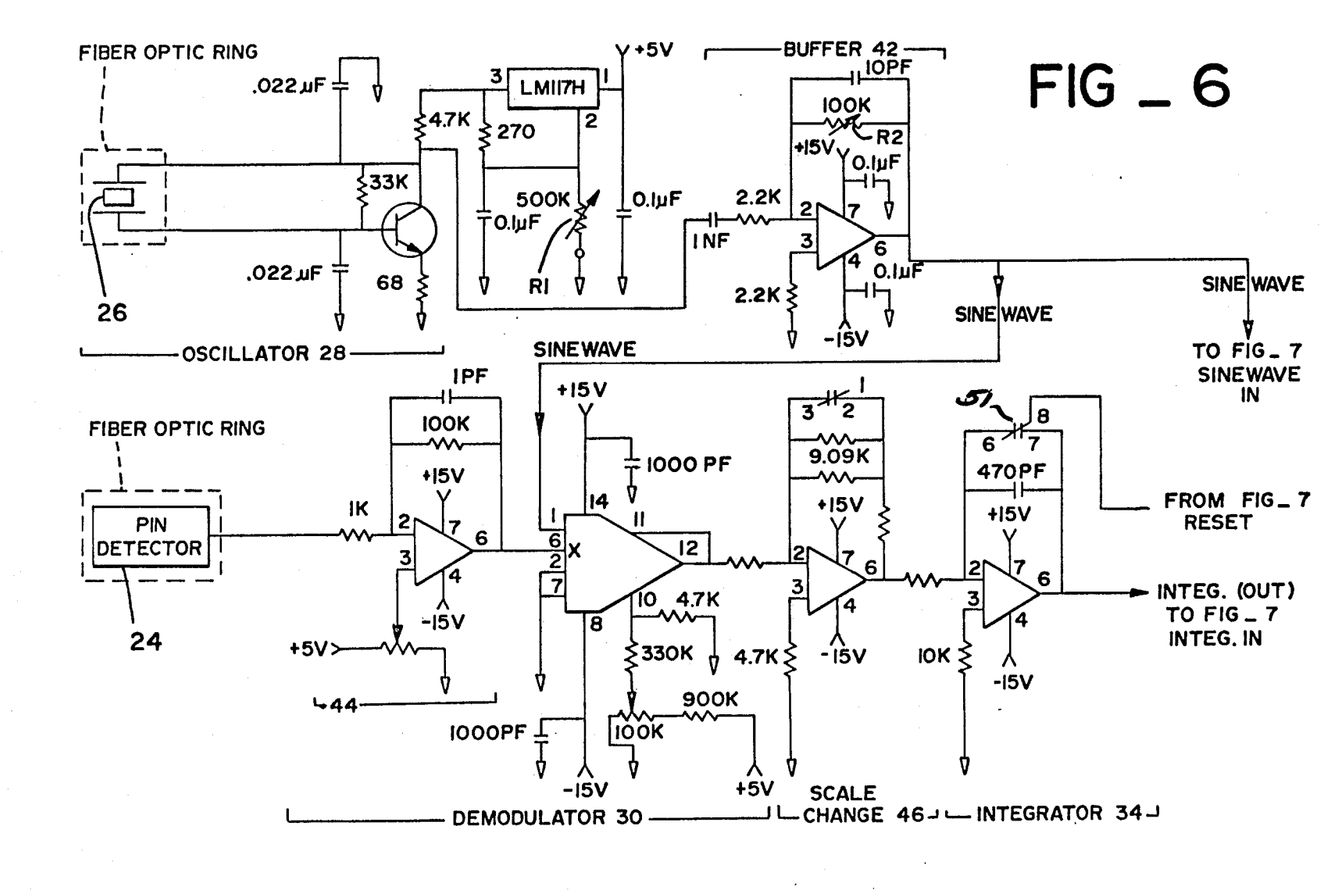
FIGS. 6 and 7 are schematic diagrams of the electronic phase modulation/signal processing circuits for a single-axis prototype embodiment of the fiber optic rate sensor.
Figure 7:
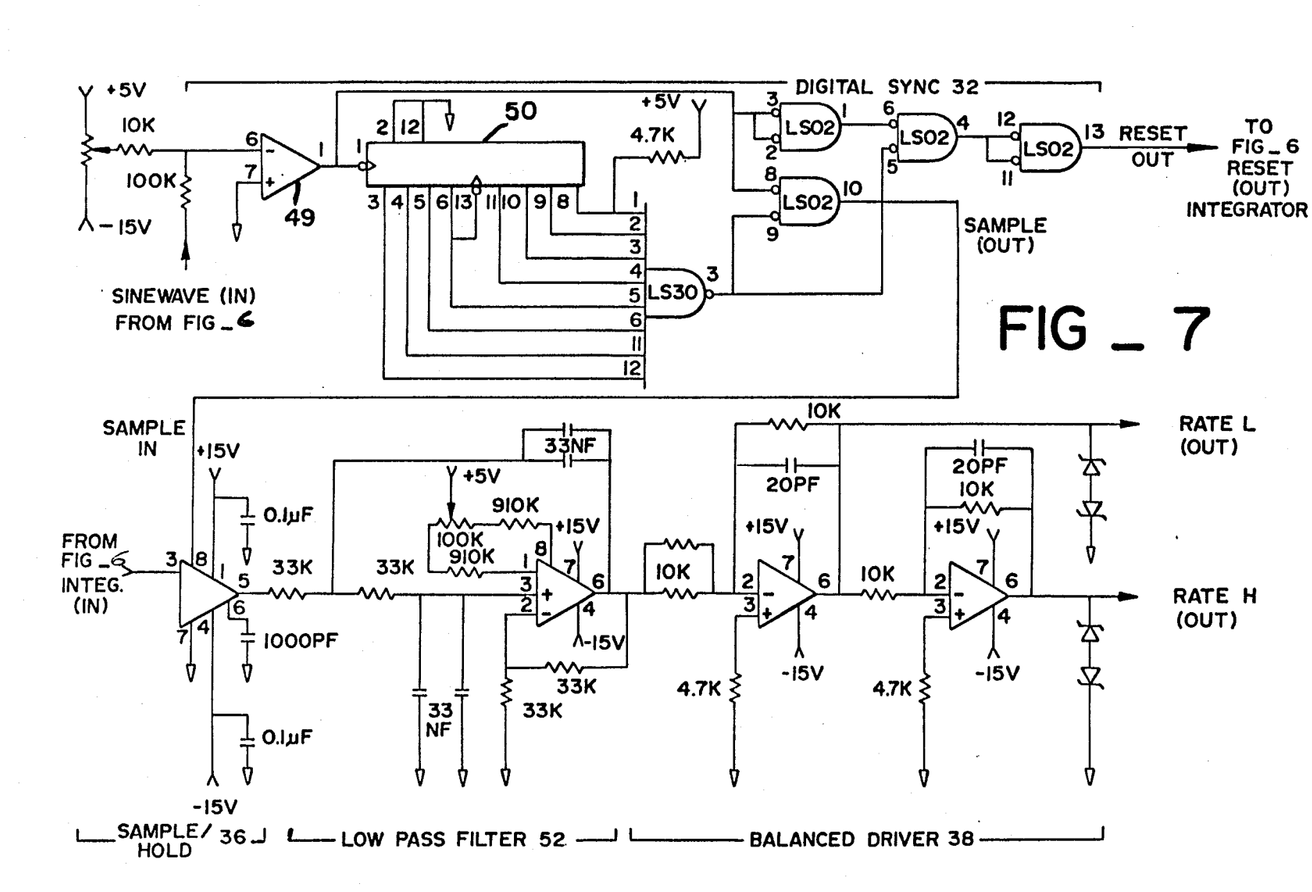
Figure 11:
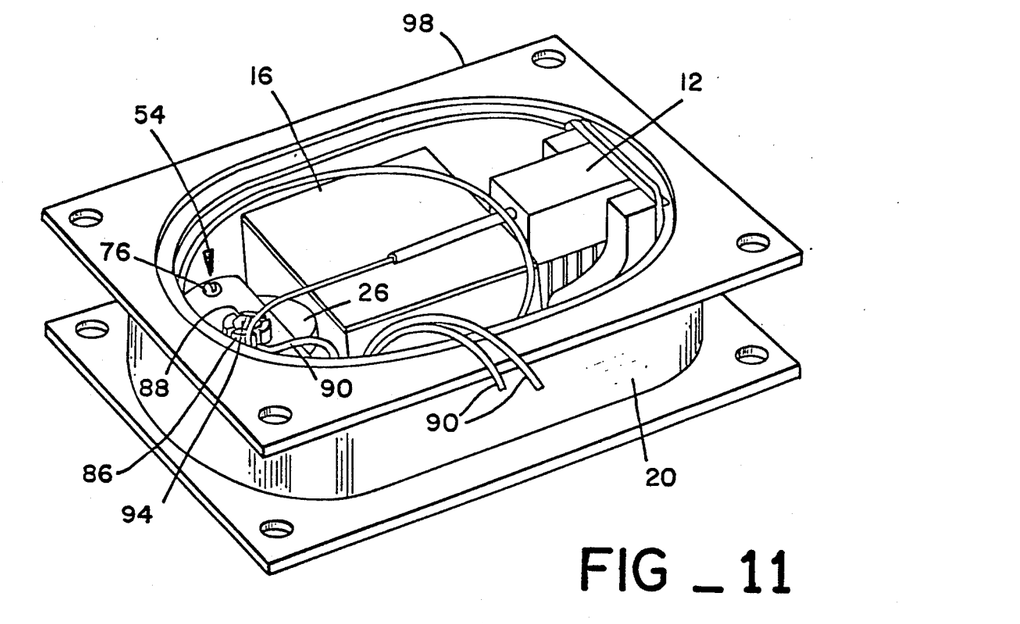
FIG. 11 illustrates the physical packaging for a prototype single-axis package.
Figure 12:
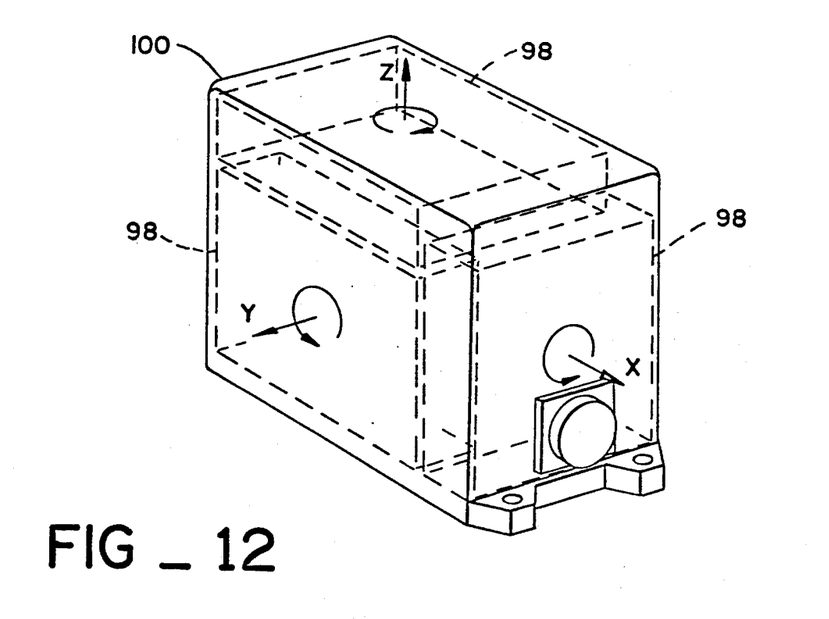
FIG. 12 illustrates the physical packaging for a prototype three-axis package.

FIGS. 6 and 7 show detailed schematic diagrams of the phase modulation and signal processing circuits of a prototype embodiment of a single-axis fiber optic rate sensor. FIGS. 8-10 illustrate a suitable holder for the PZT disk. FIGS. 11 and 12 show the physical packaging for the prototype single-axis embodiment and a three-axis embodiment. Referring to the circuit diagrams of FIGS. 6 and 7, the optical source 12 is a superluminescent diode operating at a wavelength of 850/825 nanometers (a General Optronics GO-Dip 3000) and the fiber coil 20 comprises 250 meters of Hitachi polarization-holding single mode glass fiber wound in a racetrack shape (having an average radius of approximately 4.5 inches) around the periphery of a metal box. The PZT disk 26 is 0.700 inches in diameter and 0.100 inches thick.

Referring to FIG. 6, the bracket 28 defines the PZT-controlled Colpitts oscillator (one transistor-2N222A) having a nominal operating frequency of 135 KHz. The PZT response is adjusted to operate the phase modulation at the first maximum of $J_1$ by means of potentiometer R1. The collector output of the oscillator 28 is applied through a buffer amplifier 42 to provide the sine wave reference signal which is coupled to the Y input of demodulator/multiplier circuit 30 (an AD534 chip). (Operational amplifiers OPA37 are used throughout the prototype in the various buffers and filters.) Resister R2 in buffer amplifier 42 allows the adjustment of the relative phase of the sine wave reference signal. The output of the photodetector 24 is coupled through a buffer amplifier 44 to the X input of the multiplier chip 30. The demodulated output of the multiplier chip 30 is coupled through a scale change amplifier 46 to the integrator 34. The prototype embodiment is designed to provide a peak-to-peak rate output of ±50 degrees/second or ±5 degrees/second depending on the setting of switch 48 of the scale change amplifier 46. The output of the integrator 34 is coupled to an amplifier (an LF198—see FIG. 7) operating as sample and hold circuit 36.

Referring to FIG. 7, the sine wave reference signal from buffer amplifier 42 is also coupled to a precision voltage comparator 49 (an LM139 comparator) to provide the input to a dual binary counter 50 (an LS393 circuit) of the digital synchronization circuit 32. The outputs of digital counter 50 are coupled to a network of NAND gates to provide timing pulses which are synchronized with the PZT drive voltage. A reset pulse is coupled to the integrator 34 and a sample pulse is coupled to the sample and hold circuit 36.

The integration period of the integrator 34 is controlled by a bilateral switch 51 which is operated by the reset timing pulses from the digital synchronization circuit 32. The timing pulses control the integration period by resetting the integrator 34 at the end of the integration period. The sampling period is similarly controlled by the sample timing pulses which are coupled to the sample and hold amplifier 36. In the prototype, the binary counter 50 and the NAND gates of the digital synchronization circuit 32 are coupled to provide 2 millisecond pulses in phase with the reference sine wave.

The output of the sample and hold amplifier 36 is coupled through a low-pass filter 52 and applied to the balanced driver circuit 38 to provide a rate output signal that is directly proportional to the input angular rate.

Figure 8:
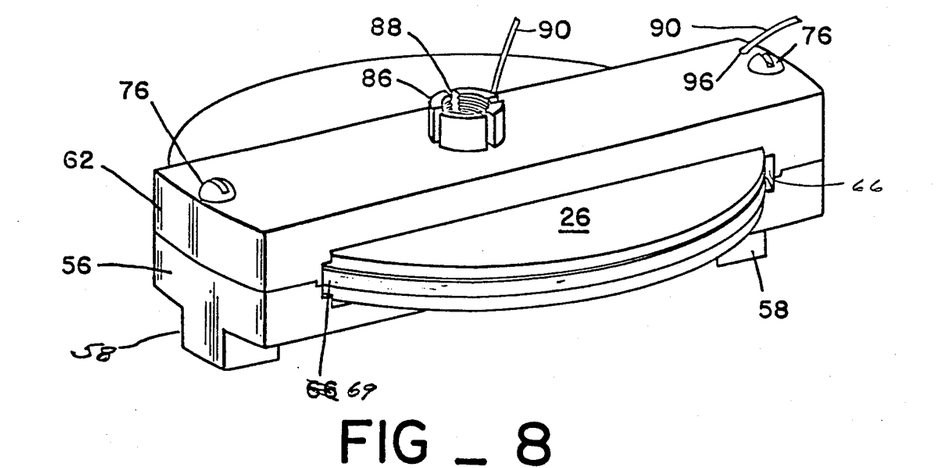
FIGS. 8 is a perspective view of a suitable holder for the PZT disk to ensure electrical and mechanical pressure contact near the center of the disk to avoid loading and Q spoiling the radial disk mode.
Figure 9:
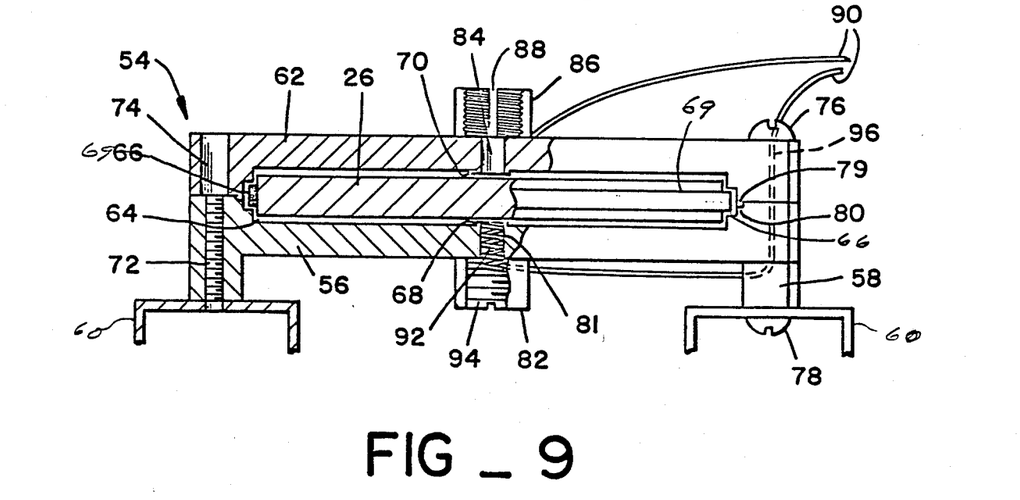
FIG. 9 is a side plan view, partially in cross-section, of the holder of FIG. 8.
Figure 10:
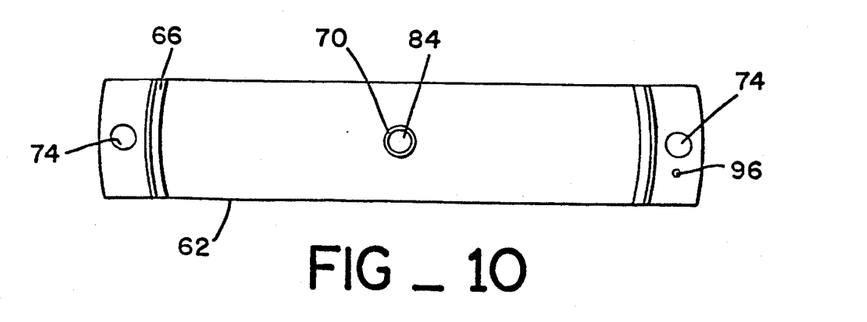
FIG. 10 is an plan view of the underside of the retaining member of the holder.

A holder 54 suitable for supporting the PZT disk 26 and making electrical and mechanical contact without loading and Q-spoiling the radial disk mode is illustrated in FIGS. 8-10. The holder 54, which is used in the prototype embodiment of the fiber-optic rate sensor, includes two opposing members, a mounting member 56 having mounting posts 58 for attaching the holder to a frame 60 and a retaining member 62. The opposing surfaces of the mounting member 56 and the retaining member 60 have central cut-away sections which form a slot 64 in which the disk 26 is retained. The slot 64 has a channel 66 at its ends to accomodate the few turns of the glass fiber 69 which are wrapped around the periphery of the disk 26. The disk 26 is supported at its center by circular ridges 68 and 70 at the center of the opposing surface of members 56 and 62, respectively. The slot 64, exclusive of the circular ridges 68 and 70 and the channel 66, is dimensioned to be a few microns larger than the disk 26 so that the disk may make simultaneous mechanical contact with the holder 54 at the circular ridges and only one other location at either end of the slot 64. This allows the disk to function as an essentially unloaded device.

The mounting member 56 has a threaded bore 72 at each end and the retaining member 62 has a corresponding smooth bore 74 at each end. The two members 56 and 62 are secured together with the disk 26 disposed in the slot 64 by screws 76 extending through the smooth bore 74 and mating with the threaded bore 72. The holder 54 is secured to the frame 60 by screws 78 mating with the threaded bore 72. A flange 79 is provided at each end of the retaining member 62 and a corresponding shoulder 80 is provided at each end of the mounting member 56 for aligning the two members.

The holder 54 provides for electrical connection to the center of each side of the disk 26 from an external oscillator circuit. The mounting member 56 has a central channel 81 and an internally threaded cylindrical post 82 which are coaxially aligned with the circular ridge 68. The retaining member has a corresponding central channel 84 and an internally threaded cylindrical post 86 which are coaxially aligned with the circular ridge 70. The cylindrical posts 82 and 86 have four symmetrically disposed longitudinal slots 88. Wires 90 from the external driving circuit pass through one of the longitudinal slots 88 in each opposing member and are soldered to a conductive compression spring 92 (of beryllium/copper) which is disposed in the central channels 80 and 84. The springs 92 are retained in the cylindrical channels 80 and 84 and maintained in electrical contact with the disk 26 by retaining nuts 94 threaded into the cylindrical posts 82 and 86. A channel 96 is provided through the opposing members 54 and 62 to facilitate the passage of one of the wires 90 to the underside of the holder 54.

FIG. 11 shows that the prototype single-axis embodiment is enclosed in an approximately one inch by three inch by four inch package. The glass fiber is wound around a metal frame 98 to form a coil 20 having a race track shape and the other elements of the sensor are mounted within the frame. FIG. 12 illustrates a three-axis embodiment in which three-single axis packages having sensing axes X, Y, and Z are mounted orthogonally within a frame 100.

Obviously, many modifications and variations of the present invention are possible in light of the above teachings. It is therefore to be understood that within the scope of the appended claims, the invention may be practiced otherwise than as described.

What is claimed and desired to be secured by Letters Patent of the United States is:

1. In a fiber optic rate sensor of the type employing a Sagnac ring circuit wherein an optical source launches an optical signal which is divided into two equal signals which are coupled in opposite directions through a multiturn fiber optic coil to provide two counter-propagating optical signals, the two counter-propagating optical signals being coupled to a photodetector after passing through the multiturn fiber coil, the signals detected at the photodetector having traversed identical optical paths between said source and said photodetector and having undergone a Sagnac phase shift directly related to the rate of rotation of the fiber coil about its axis in inertial space, and wherein the two counter-propagating signals are phase modulated by a phase modulation means at one end of the fiber optic coil and the output of the photodetector undergoes signal processing in a signal processing means to produce a rate output directly related to said rate of rotation of said fiber coil, the improvement being an improved phase modulation and signal processing means, which comprises:
   (a) a crystal-controlled oscillator, said crystal-controlled oscillator providing a sine wave reference signal;
   (b) means for coupling the crystal of said crystal-controlled oscillator to said optical fiber at one end of said coil to produce a non-reciprocal phase modulation of said counter-propagating optical signals;
   (c) means for multiplying said sine wave reference signal and the output from the photodetector to produce a product output; and
   (d) means for integrating said product output over a whole number of complete reference cycles to produce said rate output, the sine wave reference signal being coupled to said means for integrating to control the integration period of said means for integrating.

2. An improved phase modulation and signal processing means as recited in claim 1 wherein the crystal of said crystal-controlled oscillator is a piezoelectric disk.

3. An improved phase modulation and signal processing means as recited in claim 2 wherein said means for coupling the crystal of said crystal-controlled oscillator to said optical fiber at one end of said coil to produce a non-reciprocal phase modulation of said counter-propagating optical signals comprises:
   (a) several turns of said optical fiber at one end of said coil being wound around said disk.

4. An improved phase modulation and signal processing means as recited in claim 2 wherein said means for coupling the crystal of said crystal-controlled oscillator to said optical fiber at one end of said coil to produce a non-reciprocal phase modulation of said counter-propagating optical signals comprises:
   (a) several turns of said optical fiber at one end of said coil being wound around said disk, said disk operating in the radial disk fundamental mode; and
   (b) a holder for said disk which supports said disk while making electrical contact and mechanical pressure contact only near the center of the disk to avoid loading and Q spoiling the radial disk fundamental mode.

5. An improved phase modulation and signal processing means as recited in claim 4 wherein said crystal-controlled oscillator is a crystal-controlled Colpitts oscillator.

6. An improved phase modulation and signal processing means as recited in claim 1 wherein said means for integrating includes:
   (a) an integrating amplifier coupled to receive said product output; and
   (b) a synchronization circuit coupled to receive said sine wave reference signal, said synchronization circuit producing timing pulses defining a whole number of complete reference cycles, said timing pulses being coupled to said integrating amplifier to control the period of integration of said integrating amplifier.

7. An improved phase modulation and signal processing means as recited in claim 6 wherein said means for integrating further includes a sample and hold circuit coupled to receive the output of said integrating amplifier, the sampling period of said sample and hold circuit being controlled by said timing pulses from said synchronization circuit.

8. An improved phase modulation and signal processing means as recited in claim 7 further comprising:
   (a) a balanced driver circuit coupled to receive the output of said sample and hold circuit for providing said rate output signal.

9. An improved phase modulation and signal processing means as recited in claim 8 wherein said crystal-controlled oscillator is a crystal-controlled Colpitts oscillator.

10. An improved phase modulation and signal processing means as recited in claim 9 wherein the crystal of said crystal-controlled oscillator is a piezoelectric disk.

11. An improved phase modulation and signal processing means as recited in claim 10 wherein said means for coupling the crystal of said crystal-controlled oscillator to said optical fiber at one end of said coil to produce a non-reciprocal phase modulation of said counter-propagating optical signals comprises:

(a) several turns of said optical fiber at one end of said coil being wound around said disk.

12. An improved phase modulation and signal processing means as recited in claim 10 wherein said means for coupling the crystal of said crystal-controlled oscillator to said optical fiber at one end of said coil to produce a non-reciprocal phase modulation of said counter-propagating optical signals comprises:

(a) several turns of said optical fiber at one end of said coil being wound around said disk, said disk operating in the radial disk fundamental mode; and (b) a holder for said disk which supports said disk while making electrical contact and mechanical pressure contact only near the center of the disk to avoid loading and Q spoiling the radial disk fundamental mode.

13. An improved phase modulation and signal processing means as recited in claim 1 wherein said means for multiplying comprises an analog multiplier.

14. An improved phase modulation and signal processing means as recited in claim 13 wherein said means for integrating includes:

(a) an integrating amplifier coupled to receive said product output; and (b) a synchronization circuit coupled to receive said sine wave reference signal, said synchronization circuit producing timing pulses defining a whole number of complete reference cycles, said timing pulses being coupled to said integrating amplifier to control the period of integration of said integrating amplifier.

15. An improved phase modulation and signal processing means as recited in claim 14 wherein said means for integrating further includes a sample and hold circuit coupled to receive the output of said integrating amplifier, the sampling period of said sample and hold circuit being controlled by said timing pulses from said synchronization circuit.

16. An improved phase modulation and signal processing means as recited in claim 15 further comprising:

(a) a balanced driver circuit coupled to receive the output of said sample and hold circuit for providing said rate output signal.

17. An improved phase modulation and signal processing means as recited in claim 16 wherein said crystal-controlled oscillator is a crystal-controlled Colpitts oscillator.

18. An improved phase modulation and signal processing means as recited in claim 17 wherein said crystal-controlled Colpitts oscillator includes means for adjusting the modulation amplitude of the phase modulation to provide optimized signal processing.

* * * * *